United States Patent [19]

Nakamura et al.

[11] Patent Number: 4,931,623

[45] Date of Patent: Jun. 5, 1990

[54] PORTABLE STORAGE MEDIUM

[75] Inventors: Koichiro Nakamura; Yoshinori Tanaka, both of Yokohama, Japan

[73] Assignee: Kabushiki Kaisha Toshiba, Tokyo, Japan

[21] Appl. No.: 268,856

[22] Filed: Nov. 9, 1988

[30] Foreign Application Priority Data

Nov. 14, 1987 [JP] Japan ................................. 62-286477
Dec. 29, 1987 [JP] Japan ................................. 62-335031

[51] Int. Cl.⁵ .............................................. G06K 19/02
[52] U.S. Cl. ....................................... 235/488; 235/492
[58] Field of Search ................................. 235/488, 492

[56] References Cited

U.S. PATENT DOCUMENTS 4,773,620  4/1988  Moller et al. ........................ 235/492

Primary Examiner—Harold I. Pitts
Attorney, Agent, or Firm—Cushman, Darby & Cushman

[57] ABSTRACT

A portable storage medium having an electronic component therein, includes a card-shape case for housing the electronic component. The card-shape case includes a metallic plate substantially surrounding the electronic component for withstanding substantial external forces. The card-shape case includes a cushioning member which has a greater flexibility than that of the metallic plate. The cushioning member is attached to the metallic plate for cushioning a portion of the card-shape case against external forces. A magnetic stripe is flexibly supported on the card-shape case for deforming a limited amount under the application of external forces to the magnetic stripe in response to the flexibility of the cushioning member.

13 Claims, 6 Drawing Sheets

PORTABLE STORAGE MEDIUM

BACKGROUND OF THE INVENTION

1. Field of the Invention

The present invention relates to a portable storage medium with a magnetic stripe such as a multifunctional IC card with a magnetic stripe.

2. Description of the Prior Art

A multifunctional IC card houses an IC chip comprising a CPU and a memory, a liquid crystal display (hereafter LCD) and a thin battery packaged on a wiring board in a portable-sized card body. The display unit of the LCD can be seen from outside through a suitably opened window, and a keyboard is provided on the surface of the card body. Also, contacts are formed on the surface of the card body for sending/receiving required data to and from external systems, such as a reader/writer.

According to ISO (International Organisation for Standardisation) standard, the thickness of a multifunctional IC card is defined as 0.76 mm, and the length and width are also respectively defined as prescribed dimensions.

A multifunctional IC card has not only a recording function for required information, but also various functions such as key input, calculation, and character display. Therefore, in order to strengthen rigidity and to protect the housed electronic components against external impact and load, the multifunctional IC card requires high rigidity. As shown in FIGS. 1 and 2, a card body 10 of the multifunctional IC card was constructed as a metal case in which a pair of stainless steel outer plates 12 and 14 were bonded by welding to a stainless steel outer frame 16. A contact section 18 composed of a plurality of contacts is formed on stainless steel outer plate 12 and a wiring board 20 is located between the pair of stainless steel outer plates 12 and 14.

From the viewpoint of combined use with the magnetic cards as, for example, cash cards for banks, the present multifunctional IC cards are constructed as hybrid multifunctional IC cards. On the hybrid multifunctional IC card, a magnetic stripe 22 is bonded onto the surface of the card body 10 for magnetically recording information in a similar way to magnetic cards.

On the other hand, a magnetic stripe reader in the automatic cash dispenser systems provided by banks are constructed for use with a magnetic stripe bonded on to a card body which has flexibility because it is made of resin.

In a conventional multifunctional IC card with a magnetic stripe, a magnetic stripe 22 was bonded onto the surface of the stainless steel outer plate 12, which has high rigidity. Therefore, magnetic stripe 22 did not adapt itself readily to the magnetic heads MH in the magnetic stripe readers which are in general use, as shown in FIG. 3. Therefore, there were cases of incorrect reading and writing of information.

Also, since card body 10 was composed of a metal case in which a pair of stainless steel outer plates 12 and 14 were bonded to outer frame 16 by welding, there were cases of distortion occurring in outer plates 12 and 14 during welding. This resulted in wave-like deformation of the surfaces, and also caused wave-like deformation of the surface of the magnetic stripe bonded to such outer plate. Since a magnetic stripe with such a wave-like deformation often does not make correct contact with magnetic head MH, there is a problem in that randomness occurs in the magnetic output, and further difficulty is caused in the correct reading and writing of magnetic information.

Further, in a conventional multifunctional IC card with a magnetic stripe, metal with a permeability greater than 1.005 is used to form the stainless steel outer plates 12 and 14. However, since stainless steel outer plates 12 and 14 have a permeability of more than 1.005, information data often cannot be written accurately on magnetic stripe 12. That is, as shown in FIG. 4, magnetic head MH makes contact with magnetic stripe 22 the information data is being written on magnetic stripe 22 formed on outer plate 12. Magnetic flux generated by magnetic head MH, as shown by dotted lines, not only passes through the layer of magnetic stripe 22, but also passes through the layer of outer plate 12 due to a leak magnetic flux from magnetic stripe 22. Therefore, since the magnetic flux cannot pass sufficiently through magnetic stripe 22, it is difficult to obtain good magnetic recording on magnetic stripe 22. As a result, an accurate reading of the information data from magnetic stripe 22 is very difficult due to small level of output of the magnetic flux from the stripe 22 in comparison to the plate 12.

SUMMARY OF THE INVENTION

It is an object of the present invention to provide a portable storage medium which can suitably protect the housed electronic components from external impact and load, and can improve the capability for reading/writing of information data on the magnetic stripe.

According to the present invention, a portable storage medium including an electronic component therein, comprises card-shape housing means for housing the electronic component, including metallic means substantially surrounding the component for withstanding substantial external forces, and means having a greater flexibility than the metallic means attached to the metallic means for cushioning a portion of the housing means against external forces; and magnetic stripe means flexibly supported on the housing means for deforming a limited amount under the application of external forces to the stripe in response to the flexibility of the cushioning means.

Further, according to the present invention, a portable storage medium including an electronic component therein, comprises metal means having an outer surface, and a muximum permeability of about 1.005 for housing the electronic component and limiting influence on the applied external magnetic flux; and a magnetic recording region on the outer surface of the metal means for magnetically storing the data thereon.

DETAILED DESCRIPTION OF THE PREFERRED EMBODIMENTS

Figure 5:
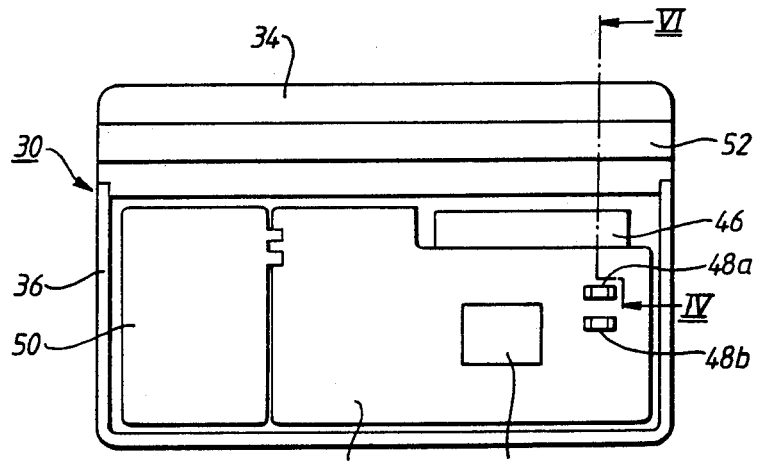
FIG. 5 is a plan view showing a first embodiment of a portable storage medium according to the present invention with an outer plate removed.
Figure 6:
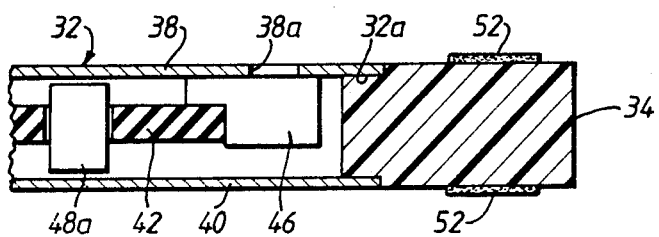
FIG. 6 is a partial sectional view of the portable storage medium of FIG. 5 taken along the line VI—VI of FIG. 5.

FIGS. 5 and 6 show a multifunctional IC card with a magnetic stripe as a portable storage medium of a first embodiment according to the present invention. Reference numeral 30 denotes a card body. Card body 30 comprises a metal case 32 and a supporting plate 34. An outer frame 36, of which the top portion is cut away, is formed in U-shape. A pair of outer plates 38 and 40 made of stainless steel are bonded by welding to both faces of outer frame 36 to form metal case 32 having a rigid construction. An opening 32a is formed at the top portion of metal case 32 corresponding to the top portion of outer frame 36. A wiring board 42 is housed in metal case 32. On wiring board 42, electronic components such as an LSI chip 44 which composes a CPU and a memory, a liquid crystal display (hereafter LCD) 46, chip condensers 48a and 48b and a thin battery 50 are mounted in a packaged state. Each electronic component is housed in this packaged state inside metal case 32. Among these electronic components, LCD 46 is housed so that it is visible from the outside through a window 38a opened in outer plate 38. Also, a contactor including a plural number of contacts (not shown) for the transmission/reception of required data to/from an external device such as a reader/writer, and keys (not shown) for a keyboard construction are provided on wiring board 42. The contacts are also visible from the outside through suitable windows opened in outer plate 38.

The parts where wiring board 42 and each electronic component are in contact with the inner faces of outer plates 38 and 40 are suitably secured by bonding with adhesives.

At opening 32a of metal case 32, supporting plate 34, made of shock-absorbent material of the same thickness as the thickness of metal case 32, is integrally bonded, thus making card body 30 of the required configuration and dimensions. Magnetic stripes 52 are attached on both surfaces of supporting plate 34.

The shock-absorbent cushioning material for supporting plate 34 may be, for example, as follows:

| Shock-absorbent material (Synthetic resin) | Modulus of longitudinal elasticity (kg/cm$^2$) |
|---|---|
| Vinyl chloride | 24,605–42,180 |
| Acrylic resin | 31,635 |
| Polycarbonate | 22,496 |
| Polyacetal | 28,828 |
| Polyamide | 18,278–28,120 |

Thus, a modulus of longitudinal elasticity of 10,000–50,000 kg/cm$^2$ is desirable as the shock-absorbent material for supporting plate 34.

As the material for magnetic stripe 52, for example, $\gamma$—Fe$_2$O$_3$+binder and as the magnetic properties, Residual magnetic flux $\phi r$: 1.25±0.5 maxwell/cm Magnetic resistance Hc: 650±50 Oe Angular ratio: 0.7 or more are used.

Since the multifunctional IC card is constructed as above, the electronic components housed are suitably protected by rigid metal case 32.

When the IC card is inserted into an IC card reader/writer, terminals of the reader/writer butt against and make contact with the contacts, and the reading and writing of the required information data is carried out, and also the required judgments and calculations are performed inside the card.

Also, when the CPU of LSI chip 44 is operated by manual operation of the keyboard, stored contents in the memory of LSI chip is confirmed through LCD 46.

When the IC card is inserted into the magnetic stripe reader of an automatic cash dispenser system, magnetic stripe 52 attached to supporting plate 34, is placed correctly in contact with a magnetic head of the magnetic stripe reader. As a result, the above-listed magnetic properties are fully exhibited, and thus the information data recorded on magnetic stripe 52 is correctly read out, and the IC card functions correctly as a magnetic card.

Figure 7:
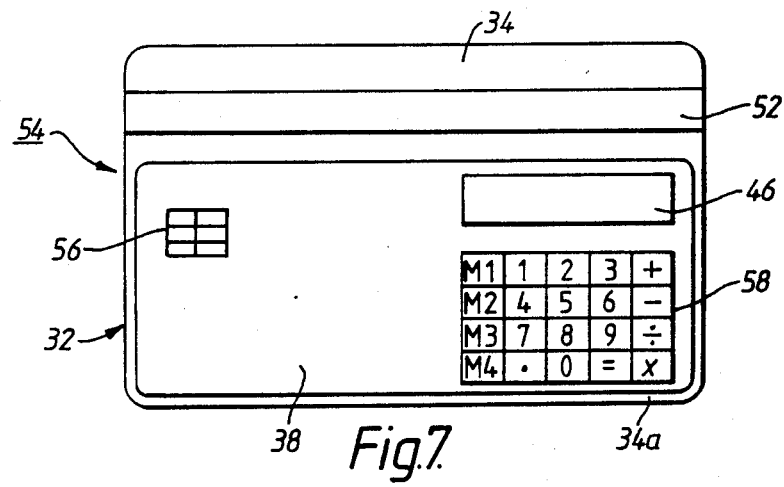
FIG. 7 is a plan view showing a second embodiment of a portable storage medium according to the present invention.

A second embodiment of the present invention is shown in FIG. 7. Incidentally, in FIG. 7 and in the following FIGS. 8 through 14 which show each embodiment, components and positions which are the same or equivalent to those in FIGS. 5 and 6 are shown with the same reference numerals to avoid repetitional descriptions.

In the second embodiment, an extended portion 34a of supporting plate 34 is bonded throughout the whole of metal case 32, and thus the bond strength between metal case 32 and supporting plate 34 in the card body 54 is increased. Reference numeral 56 denotes a contactor including a plural number of contacts, and 58 denotes a keyboard.

The functions of the multifunctional IC card of the second embodiment are similar to those in the first embodiment. However, longer life is achived by increasing the bond strength between supporting plate 34 and metal case 32 in card body 54.

Figure 8:
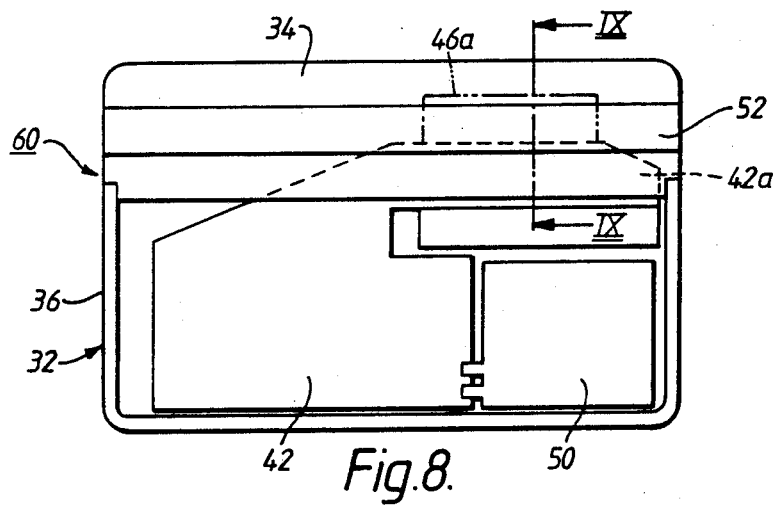
FIG. 8 is a plan view showing a third embodiment of a portable storage medium according to the present invention with an outer plate removed.
Figure 9:
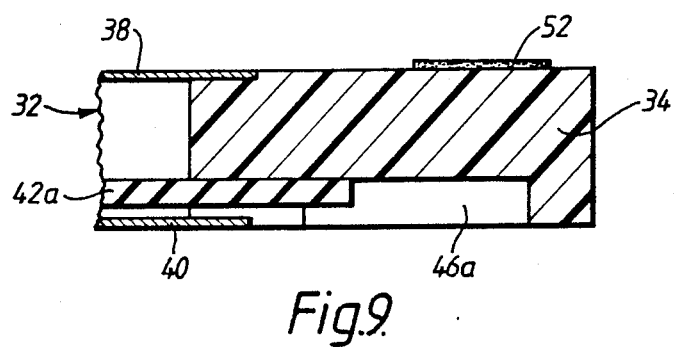
FIG. 9 is a partial sectional view of the portable storage medium of FIG. 8 taken along the line IX—IX of FIG. 8.

FIGS. 8 and 9 show a third embodiment of the present invention. The construction of the card body 60 is similar to that in the first embodiment shown in FIGS. 5 and 6. However, an extended portion 42a is extended from wiring board 42 to supporting plate 34 and is bonded to supporting plate 34. Wiring board 42 is securely bonded to both outer plates 38 and 40 directly or via the packaged electrical components in the side of metal case 32, and extended portion 42a of wiring board 42 is bonded to supporting plate 34. Thus, the bond strength between metal case 32 and supporting plate 34 in card body 60 is increased in the same way as in the second embodiment. LCD 46a may be mounted on extended portion 42a of wiring board 42 in supporting plate 34.

Figure 10:
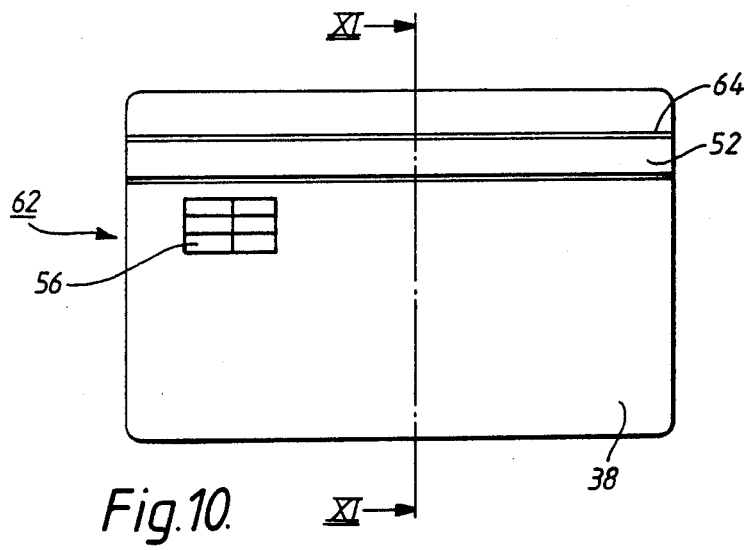
FIG. 10 is a plan view showing a fourth embodiment of a portable storage medium according to the present invention.
Figure 11:
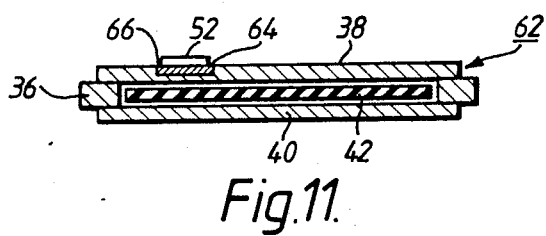
FIG. 11 is a sectional view of the portable storage medium of FIG. 10 taken along the line XI—VI of FIG. 10.

A fourth embodiment of the present invention is shown in FIGS. 10 and 11. A groove 64 which is slightly wider than magnetic stripe 52 is formed in outer plate 38 of a card body 62. A cushion member 66 made of silicone resin is provided in this groove 64. As cushion member 66, for example, silicone resin TSE3663, TSI3101 or TSE25 (trade names; manufactured by Toshiba Silicone Co.) may be used. The silicone resin is filled into groove 64 so that the surface of cushion member 66 is level. Magnetic stripe 52 is attached to cushion member 66.

According to the fourth embodiment, compared with the first embodiment, the construction of the structural unit having shock-absorbency can be simplified. In this type of simplified construction, the surface of cushion member 66 can be made level even if wave-like deformation occurs on the surface of outer plate 38 due to distortion when welding it to outer frame 36. Therefore, it is possible to put the magnetic head accurately into contact with magnetic stripe 52 without any effect of wave-like deformation of the surface of outer plate 38. Thus, randomness of magnetic output can be prevented and reading operation of information data can be correctly carried out.

Figure 12:
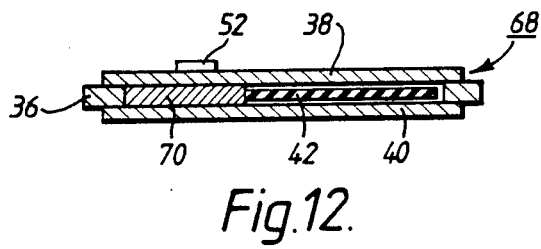
FIG. 12 is a sectional view showing a fifth embodiment of a portable storage medium according to the present invention.

A fifth embodiment of the present invention is shown in FIG. 12. A cushion member 70 made of silicone resin is provided beneath the surface of outer plate 38 to which magnetic stripe 52 is bonded, that is, inside a card body 68. In the fifth embodiment, in order to increase the shock-absorbent effect of cushion member 70, the area occupied by wiring board 42 is made as small as possible and cushion member 70 is provided over approximately one third of the width of the inside of card body 68.

With the simplified construction of the fifth embodiment, the readability of the magnetic information data can be increased by making magnetic stripe 52 correctly contact with the magnetic head.

Figure 13:
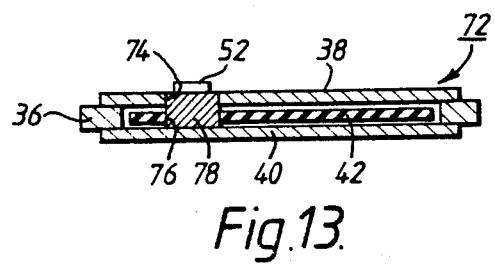
FIG. 13 is a sectional view showing a sixth embodiment of a portable storage medium according to the present invention.

A sixth embodiment of the present invention is shown in FIG. 13. In a card body 72, part of outer plate 38 and wiring board 42 are cut away to form openings 74 and 76 at the bonding position of magnetic stripe 52 and a cushion member 78 made of silicone resin is provided in openings 74 and 76.

With the construction of the sixth embodiment, the shock-absorbent effect by cushion member 78 can be further increased when compared with the fourth embodiment (FIG. 11) and the fifth embodiment (FIG. 12).

Figure 14:
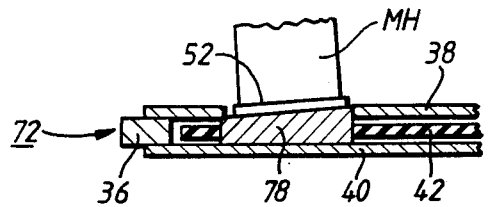
FIG. 14 is a partial sectional view of the portable storage medium of FIG. 13 showing a magnetic read/write operation with a magnetic head.
Figure 15:
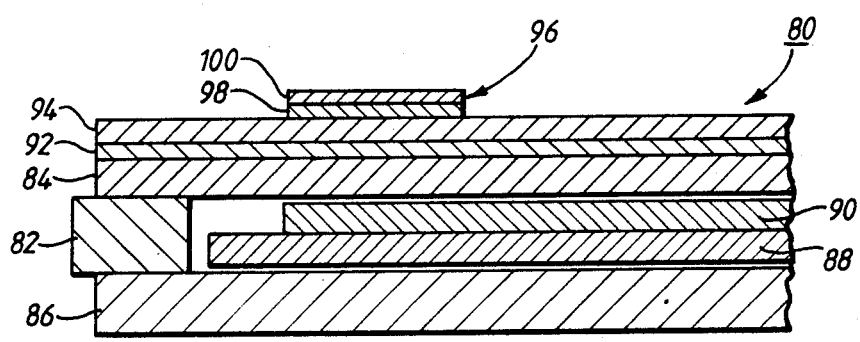
FIG. 15 is a partial sectional view showing a seventh embodiment of a portable storage medium according to the present invention.

FIG. 14 is an illustration of magnetic stripe 52 being correctly in contact with magnetic head MH due to the shock-absorbent action of cushion member 78 in the sixth embodiment.

A seventh embodiment of the present invention will be described with reference to FIGS. 15 to 18. As shown in in FIG. 15, a card body comprises an outer frame 82 and a pair of outer plates 84 and 86 made of metal which are bonded by welding to both faces of outer frame 82. In card body 80, a wiring board 88 on which electronic components 90 are mounted is housed. An under layer 92 is laminated on to outer plate 84 and a printed layer 94 is coated on under layer 92. A magnetic stripe 96 is mounted on printed layer 94. This magnetic stripe 96 comprises a magnetic layer 98, which forms the magnetic recording medium, and an overcoat layer 100 on magnetic layer 98.

Figure 1:
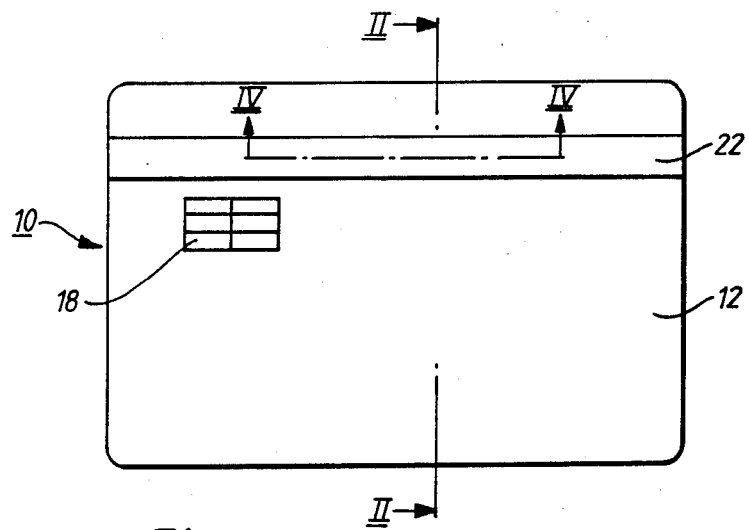
FIG. 1 is a plan view showing a portable storage medium of the prior art.
Figure 2:
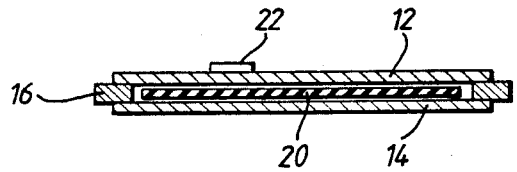
FIG. 2 is a sectional view of the portable storage medium of FIG. 1 taken along the line II—II of FIG. 1.
Figure 3:
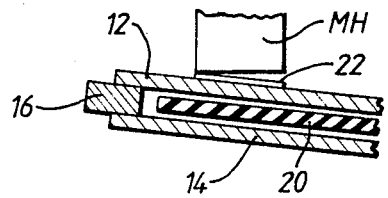
FIG. 3 is a partial sectional view of the portable storage medium of FIG. 1 showing a magnetic read/write operation with a magnetic head.
Figure 4:
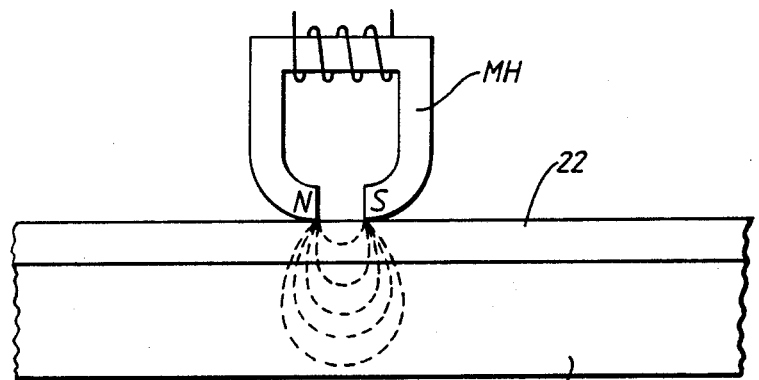
FIG. 4 is a partial sectional view of the portable storage medium of FIG. 1 along the longitudinal direction of a magnetic stripe showing the magnetic read/write operation with the magnetic head.
Figure 16:
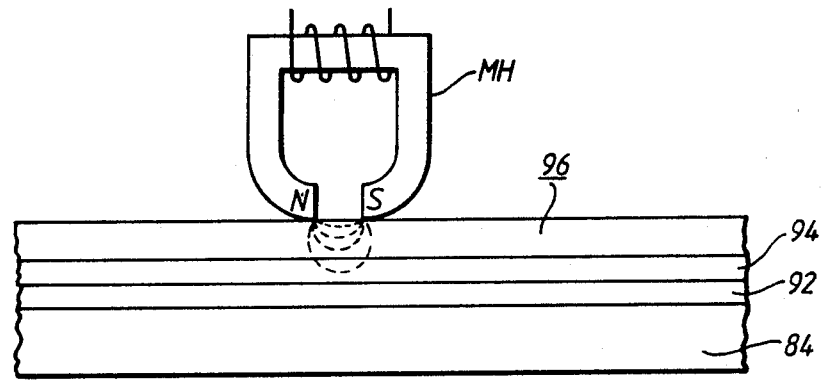
FIG. 16 is a partial sectional view of the portable storage medium of FIG. 15 along the longitudinal direction of a magnetic stripe showing the magnetic read/write operation with a magnetic head.

Outer plate 84 is designed to protect electronic components 90 mechanically, and is formed of metal with a permeability of 1.005 or less. By this means, the unfavorable effect on the magnetic stripe, as shown in FIG. 4 in prior art, is reduced. That is, as shown in FIG. 16, magnetic head MH makes contact with magnetic stripe 96 when the information data is being written on magnetic stripe 96. Magnetic flux generated by magnetic head MH, as shown by the dotted lines, almost passes through the layer of magnetic stripe 96. Therefore, since the magnetic flux passes sufficiently through magnetic stripe 96, a good magnetic recording and reading out operation can be performed.

Figure 17:
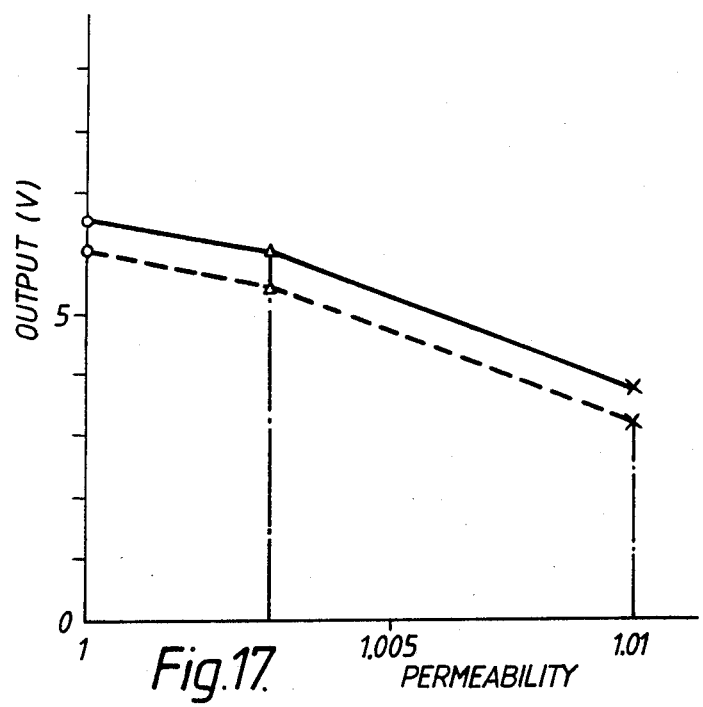
FIG. 17 is a graph showing the relationship between the permeability of the magnetic stripe used in the portable storage medium of FIG. 15 and the output voltage.

FIG. 17 is a graph showing the output read out from magnetic stripe 96 when the permeability of the metal used as outer plate 84 is varied. A curve shown by the solid line shows the mean voltage when the output read out from magnetic stripe 96 is logic "0", and the dotted line is logic "1". The output voltages from magnetic stripe 96 fall as the permeability increases. Also, it can be seen that the voltage difference between the output voltages for logic "0" and logic "1" is comparatively small and hardly varies.

Figure 18:
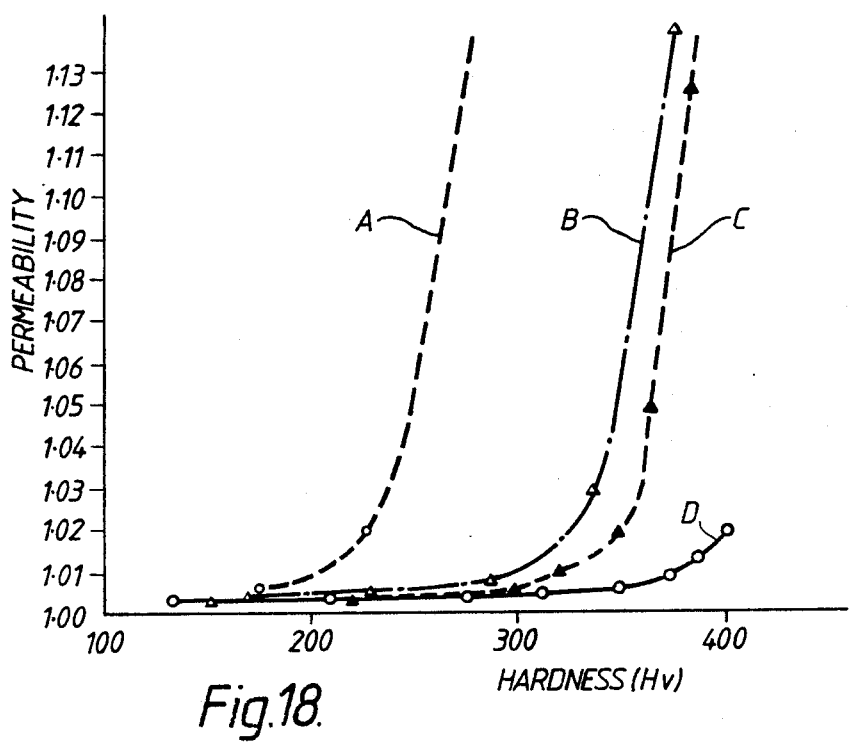
FIG. 18 is a graph showing the relationship between the hardness of the metal used as an outer plate and the permeability.

FIG. 18 is a graph showing the permeability against the hardness of the metal when four types of metals with different properties were used as the metal for outer plate 84. A curve A shows the properties when "SUS304" (Steel Special Use Stainless is abbreviated "SUS" in Japanese Industrial Standard) was used as the metal, curve B shows the properties when "SUS316" was used, curve C shows the properties when "SUS316L" was used, and curve D shows the properties when "NAR-304G" made by Nippon Stainless Steel Co. was used.

As show in FIG. 18, it can be seen that when the hardness increased, the permeability rapidly increased after it has exceeded a certain point. The point at which the hardness starts to increase in this way is in the region of a permeability of about 1.005. Therefore, from the curves shown in FIGS. 17 and 18, it is desirable to form outer plate 84 of a metal with a permeability of 1.005 or less.

By setting the permeability at 1.005 or less in this way, as shown in FIG. 18, the type of metal, that is to say the material, can be determined according to the required hardness. For instance, it can be seen from FIG. 18 that when a metal with a hardness of 300–350 Hv is required, "NAR-304G" is a suitable example.

Although an IC card is exemplified in the above description of the first to seventh embodiments as the portable storage medium, the present invention is not limited to IC cards.

What is claimed is:

1. A portable storage medium including an electronic component therein, comprising:
    card-shape housing means for housing the electronic component, including metallic means substantially surrounding the component for withstanding substantial external forces, and means having a greater flexibility than the metallic means attached to the metallic means for cushioning a portion of the housing means against external forces; and
    magnetic stripe means flexibly supported on the housing means for deforming a limited amount under the application of external forces to the stripe in response to the flexibility of the cushioning means.

2. The portable storage medium of claim 1 wherein the metallic means includes a metal case.

3. The portable storage medium of claim 2 wherein the metal case has a maximum permeability of about 1.005.

4. The portable storage medium of claim 2 wherein the metal case includes an outer frame and a pair of outer plates bonded to the outer frame.

5. The portable storage medium of claim 4 wherein the outer plates includes stainless steel.

6. The portable storage medium of claim 2 wherein the cushioning means includes a synthetic resin supporting plate, the supporting plate being integrally bonded to the metal case.

7. The portable storage medium of claim 6 wherein the supporting plate has a modulus of longitudinal elasticity of 10,000–50,000 kg/cm$^2$.

8. The portable storage medium of claim 2 further including a wiring board for mounting the electronic component, the wiring board having an extended portion, and wherein the cushioning means includes a supporting plate integrally bonded to the extended portion of the wiring board.

9. The portable storage medium of claim 2 wherein the metal case includes a groove formed thereon for receiving the cushioning means, the magnetic stripe being attached directly to the cushioning means.

10. The portable storage medium of claim 2 wherein the cushioning means is inside the metal case at a position corresponding to the location of the magnetic stripe on the housing means.

11. The portable storage medium of claim 2 wherein the metal case includes a recess formed therein for receiving the cushioning means, the magnetic stripe being attached to the cushioning means.

12. A portable storage medium including an electronic component therein, comprising:
    metal means having an outer surface, and a maximum permeability of about 1.005 for housing the electronic component and limiting influence on the applied external magnetic flux; and
    a magnetic recording region on the outer surface of the metal means for magnetically storing the data thereon.

13. The portable storage medium of claim 12 wherein the metal means includes a metal outer plate, an under layer on the metal outer plate, and a printed layer on the under layer.

* * * * *